US012808420B2

(12) United States Patent
Park et al.

(10) Patent No.: US 12,808,420 B2
(45) Date of Patent: Nov. 24, 2026

(54) SHOCK ABSORPTION STRUCTURE AND SHOCK ABSORPTION SYSTEM USING SAME

(71) Applicant: DURIAN COMPANY INC., Nonsan-si (KR)

(72) Inventors: Wan Sun Park, Seoul (KR); Da Hyun Choi, Goyang-si (KR)

( * ) Notice: Subject to any disclaimer, the term of this patent is extended or adjusted under 35 U.S.C. 154(b) by 360 days.

(21) Appl. No.: 18/575,705

(22) PCT Filed: Jun. 24, 2022

(86) PCT No.: PCT/KR2022/009083
§ 371 (c)(1),
(2) Date: Dec. 29, 2023

(87) PCT Pub. No.: WO2023/277468
PCT Pub. Date: Jan. 5, 2023

(65) Prior Publication Data

US 2024/0301935 A1 Sep. 12, 2024

(30) Foreign Application Priority Data

Jul. 2, 2021 (KR) ........................ 10-2021-0087293
Jul. 2, 2021 (KR) ........................ 10-2021-0170024

(51) Int. Cl.
*F16F 7/12* (2006.01)

(52) U.S. Cl.
CPC .......... *F16F 7/12* (2013.01); *F16F 2222/126* (2013.01); *F16F 2224/0241* (2013.01);
(Continued)

(58) Field of Classification Search
CPC ................... F16F 7/12; F16F 2222/126; F16F 2224/0241; F16F 2230/06; F16F 2230/18;
(Continued)

(56) References Cited

U.S. PATENT DOCUMENTS

| | | | | |
|---|---|---|---|---|
| 1,519,967 A * | 12/1924 | Hughes | B60R 19/20 | 293/122 |
| 2,876,979 A * | 3/1959 | Barbera | F16F 13/00 | 267/140.11 |
| 3,971,583 A * | 7/1976 | Kornhauser | B60R 21/26005 | 267/116 |

FOREIGN PATENT DOCUMENTS

| | | |
|---|---|---|
| CN | 111114480 A | 5/2020 |
| JP | 2013-220775 A | 10/2013 |

(Continued)

OTHER PUBLICATIONS

WO document No. WO 89/03328 to Park published on Apr. 20, 1989.*

(Continued)

*Primary Examiner* — Pamela Rodriguez
(74) *Attorney, Agent, or Firm* — KORUS Patent, LLC; Seong Il Jeong

(57) ABSTRACT

Proposed are a shock absorption structure and a shock absorption system using same, in which the shock absorption structure includes a body which is installed on a vehicle, a ship, and a road facility is filled with air inside, and can absorb shock occurring due to collision of a damaging object to absorb at least a predetermined level of impact force regardless of a direction in which the collision is applied and minimize damages due to accidents that may occur successively, wherein a plurality of fiber threads is provided inside the body, with air filled therein, such that when the damaging object applies at least a predetermined level of impact to one point of the body, fiber threads connected to portions adjacent to the one point break, and the body absorbs shock as the portions adjacent to the one point of the body wrap around the damaging object.

12 Claims, 11 Drawing Sheets

(52) U.S. Cl.
CPC ....... *F16F 2230/06* (2013.01); *F16F 2230/18* (2013.01); *F16F 2230/22* (2013.01)

(58) Field of Classification Search
CPC ...... F16F 2230/22; B60R 19/03; B60R 19/20; E01F 15/148
See application file for complete search history.

(56) References Cited

FOREIGN PATENT DOCUMENTS

| | | | |
|---|---|---|---|
| KR | 90-4558 | Y1 | 5/1990 |
| KR | 91-9528 | Y1 | 12/1991 |
| KR | 1999-0049459 | A | 7/1999 |
| KR | 10-2360018 | B1 | 2/2022 |

OTHER PUBLICATIONS

Translation of Japanese Patent No. JP 2013-220775 to Ono et al obtained from website: https://worldwide.espacenet.com on Feb. 17, 2026.*
International Search Report dated Oct. 13, 2022 in International Application No. PCT/KR2022/009083.

* cited by examiner

[a] [b]

SHOCK ABSORPTION STRUCTURE AND SHOCK ABSORPTION SYSTEM USING SAME

CROSS-REFERENCE TO RELATED APPLICATIONS

This application is the U.S. national stage application of International Patent Application No. PCT/KR2022/009083, filed Jun. 24, 2022, which claims the benefit under 35 U.S.C. § 119 of Korean Application Nos. 10-2021-0087293, filed Jul. 2, 2021; and 10-2021-0170024, filed Jul. 2, 2021; the disclosures of each of which are incorporated herein by reference in their entirety.

TECHNICAL FIELD

The present disclosure relates to a shock absorption structure and a shock absorption system using the same and, more particularly, to a shock absorption structure that can be installed on a vehicle, a ship, and a road facility, etc. to absorb impact force, and a shock absorption system using the same.

BACKGROUND ART

In general, a vehicle has bumpers installed respectively on front and rear thereof to reduce impact force in the event of a collision with another vehicle, a person, or an external object, thereby reducing damage to the vehicle, and injuries to passengers and pedestrians. However, despite such bumpers, accidents causing significant damage occur frequently. In particular, in the case of a vehicle stopped on the road for work, it is difficult to absorb shock in the event of a collision, so the impact force is directly transmitted to the vehicle and a passenger. Accordingly, a truck mounted attenuator (TMA) known as a truck-mounted shock absorber is being installed on vehicles that stop on the road for work.

In addition, considering that collisions between road facilities and vehicles frequently occur at the starting point of a guardrail or the separation point of a road, which are installed to guide vehicle driving and inhibit major accidents, road facilities also have shock absorber installed to protect vehicles and passengers.

Meanwhile, not only does the hull of a ship constantly collide with waves, but the ship also collides with port facilities while berthing at a port, and there is always a possibility of collision of the ship with floating objects, reefs, or other ships. Accordingly, a ship has a shock absorber installed in a part of hull where collisions frequently occur.

As described above, a shock absorber installed on vehicles, road facilities, and ships, etc. is usually filled with air inside and is configured to absorb impact force when an impact is applied. When a collision accident occurs primarily, the internal air is completely discharged to the outside while the shock absorber absorbs the impact force and, so the shock absorber cannot reduce damage caused by secondary or tertiary accidents.

In addition, such a conventional shock absorber can absorb at least a certain level of impact force, but there is a significant difference in impact force that the shock absorber can absorb depending on a direction in which a shock is applied. Accordingly, even with the installation of the shock absorber, collision accidents resulting in significant human and material damage often occur.

In addition, the conventional shock absorber has significant weight, so many parts are required to install the shock absorber on a vehicle, road facility, or ship, etc. In particular, in the case of a vehicle, fuel efficiency of the vehicle is significantly reduced due to increased weight.

DISCLOSURE

Technical Problem

The present disclosure has been made to solve the above problems, and is intended to propose a shock absorption structure which is installed on a vehicle, a ship, and a road facility, etc. to be able to absorb at least a predetermined amount of impact force regardless of a direction in which collision is applied and minimize damage due to accidents that may occur successively.

Technical Solution

In order to accomplish the above objectives, a shock absorption structure of the present disclosure includes: a body which is filled with air inside and is able to absorb a shock occurring due to a collision of the body with a damaging object, wherein a plurality of fiber threads for tautly connecting front and rear surfaces of the body to each other is provided inside the body, with air filled therein.

In addition, the body may be provided with a strength reinforcement member made of aramid fibers at least on a front surface thereof.

In addition, the body may include a plurality of bodies arranged adjacently to each other such that a rear surface of one body and a front surface of another body are adjacent to each other so that a front surface of any one body of the bodies faces outward.

In addition, the body may include a first body having a front surface facing outward, and a second body having a front surface arranged adjacently to a rear surface of the first body and having a rear surface installed adjacently on an installation mount, wherein the first body may be filled with air of pressure lower than air filled in the second body.

In addition, the body may be provided with an air inlet configured to inject air into the body and an air outlet configured to remove air from the inside of the body so as to increase and decrease air filled in the body.

In addition, the air outlet may be provided with a spring so that an entrance of the air outlet is sealed due to elasticity of the spring, and when a force greater than an elastic force of the spring is applied to the body from the outside, air may be discharged through the entrance, wherein the body may be provided with a plurality of air outlets respectively provided with springs having different elastic forces.

In addition, the air outlet may have a filter provided inside the body, with the filter being configured to filter foreign substances so that only air is discharged through an entrance of the air outlet.

In addition, the body may have a burst inducing part formed on at least one point thereof, with the burst inducing part having a surface strength weaker than surface strengths of the remaining portions of the body, and when a high-pressure collision occurs within a short period of time, air may be discharged through the air outlet and the burst inducing part may burst.

In addition, the body may be provided with a tension line which has a shape of an elastic band and wraps around a side surface of the body, wherein the tension line may be positionally fixed at predetermined intervals on the side surface of the body and may extend as the body is supplied with air, and when air inside the body is discharged to the outside, the side surface of the body may be rolled up by the tension line.

Meanwhile, in order to achieve the above objectives, a shock absorption system using the shock absorption structure of the present disclosure includes the shock absorption structure; and an air pump for injecting air into the body or removing air from the inside of the body.

In addition, the system may further include: a collision detection sensor configured to detect at least one of volume, weight, speed, and distance of the damaging object in real time, wherein the air pump may inject air into the body or remove air from the inside of the body on a basis of information detected by the collision detection sensor.

In addition, while the body is in a state in which air is not supplied or is supplied by a predetermined amount inside the body, air may be injected into the body by the air pump when a collision of the body with the damaging object is expected on the basis of the information detected by the collision detection sensor.

Advantageous Effects

According to the present disclosure, when the damaging object applies at least a certain level of impact to one point of the body, fiber threads connected to portions adjacent to the one point break, and the portions adjacent to the one point of the body wrap around the damaging object, so at least a certain level of impact force regardless of the direction of collision can be stably absorbed not only for the installation mount provided with the body, but also for the damaging object colliding with the body, thereby significantly reducing human and material damage due to collision accidents.

Additionally, the body filled with air inside and having the front and rear surfaces connected to each other by the fiber threads is manufactured to be relatively light in weight compared to a conventional shock absorber, thereby inhibiting a significant decrease of fuel efficiency by installing the shock absorption structure.

In addition, in the process of absorbing a shock, the body does not explode, but only a predetermined amount of air inside the body is discharged according to the amount of the shock, and thus it is possible to prepare for secondary and tertiary accidents that may occur after a first accident, thereby minimizing damages due to accidents that may occur successively.

MODE FOR INVENTION

Figure 1:
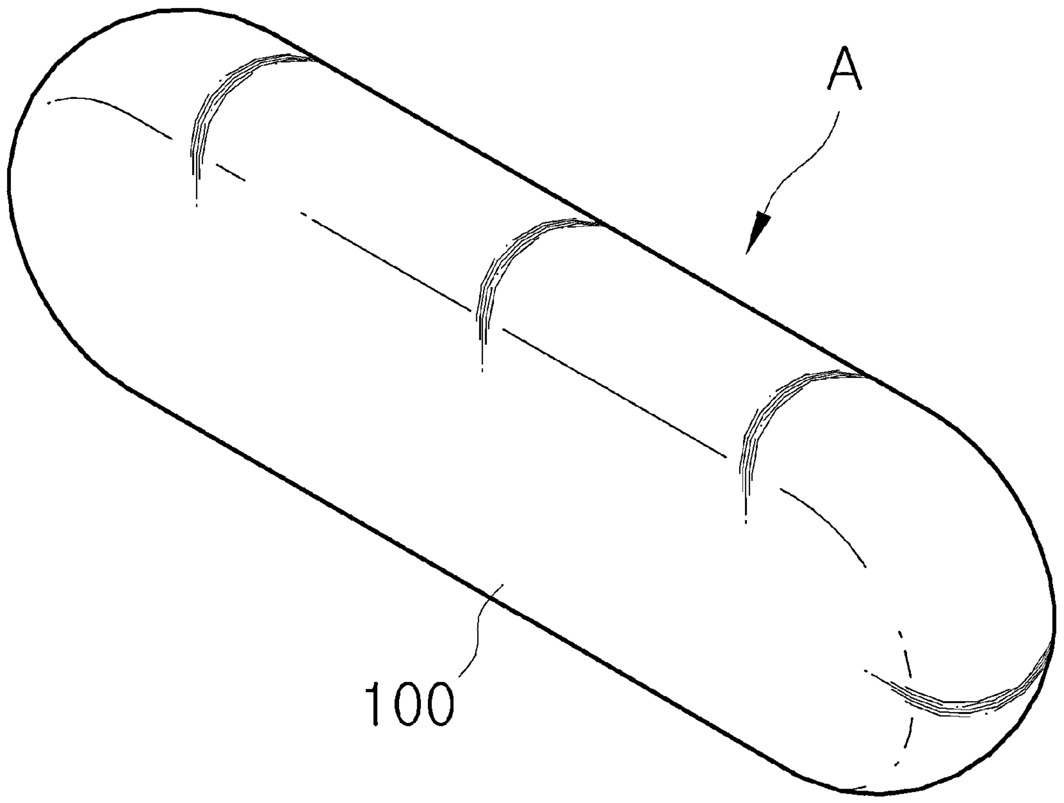
FIG. 1 is a perspective view illustrating a shock absorption structure of the present disclosure according to an embodiment.

The present disclosure provides a shock absorption structure which includes a body which is installed on a vehicle, a ship, and a road facility, etc., is filled with air inside, and can absorb shock occurring due to collision of a damaging object in order to be able to absorb at least a certain level of impact force regardless of a direction in which the collision is applied and to minimize damages due to accidents that may occur successively, wherein a plurality of fiber threads for tautly connecting the front and rear surfaces of the body to each other is provided inside the body, with air filled therein, such that when the damaging object applies at least a certain amount of impact to one point of the body, fiber threads connected to portions adjacent to the one point break, and the body absorbs shock as the portions adjacent to the one point of the body wrap around the damaging object.

In addition, the present disclosure provides a shock absorption system using a shock absorption structure which includes the shock absorption structure; and an air pump for injecting air into the body or removing air from the body.

The scope of claims of the present disclosure is not limited to the embodiment described below, and the embodiment may be modified and implemented in various ways by those skilled in the art without departing from the technical gist of the present disclosure.

Hereinafter, the shock absorption structure of the present disclosure and the shock absorption system using the same will be described in detail with reference to FIGS. 1 to 13.

First, the shock absorption structure A of the present disclosure includes the body 100 filled with air inside as illustrated in FIGS. 1*a*-2*b*. As illustrated in FIGS. 3*a* and 3*b*, the body 100 may be installed on an installation mount 20, such as a vehicle, a ship, a guardrail, and a road facility, etc., and is configured to absorb a shock caused by the collision of the damaging object 10 that moves toward and collides with the installation mount 20.

The installation mount 20 may vary as described above, and a position at which the body 100 is installed on the installation mount 20 may also vary. The body 100 is not limited to having the shape of a long barrel as illustrated in the drawings and may be formed in various shapes. In addition, the body 100 is not installed on a separate installation mount 20, but may be placed on the ground and used as a safety mat to inhibit an injury by absorbing a shock due to a fall.

In addition, the body 100 may be made of various materials that can withstand a predetermined level of impact force and have elasticity. For example, the body 100 may be made of a urethane-based terraced TPU material with excellent elasticity. Due to the nature of the urethane-based terraced TPU material, the body may have a large contact area in the event of a collision and may reduce the mobility of the damaging object 10 or/and the installation mount 20 by heat generated during the collision, thereby inhibiting a secondary accident due to bouncing or missing.

Figure 2A:
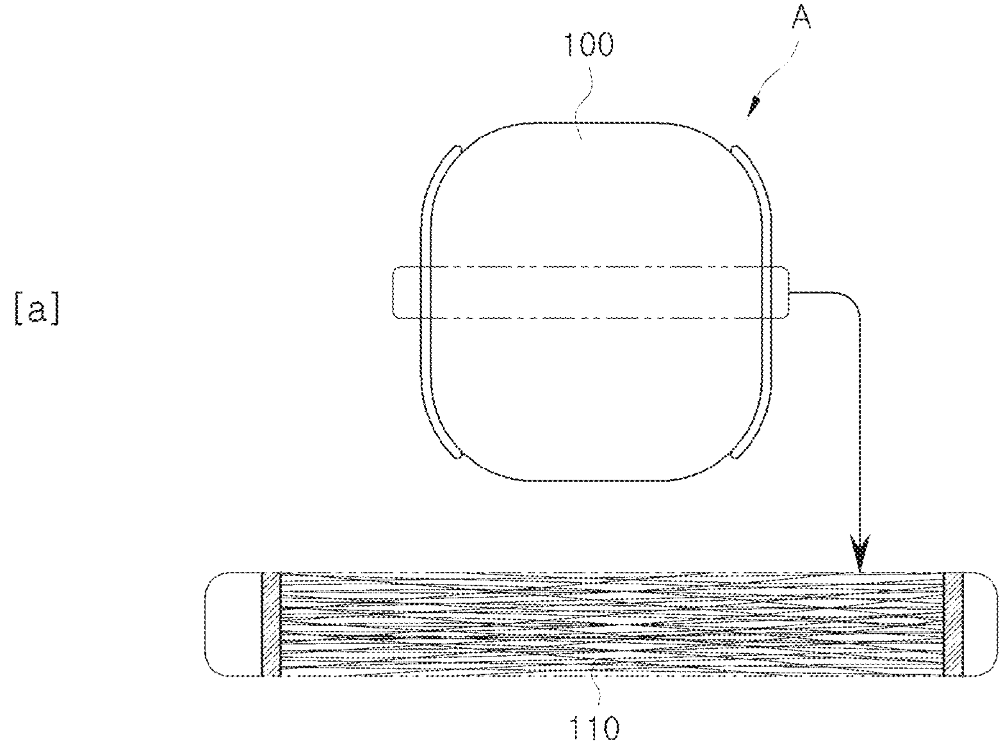
FIGS. 2*a* and 2*b* are cross-sectional views illustrating the shock absorption structure of the present disclosure according to the embodiment.
Figure 2B:
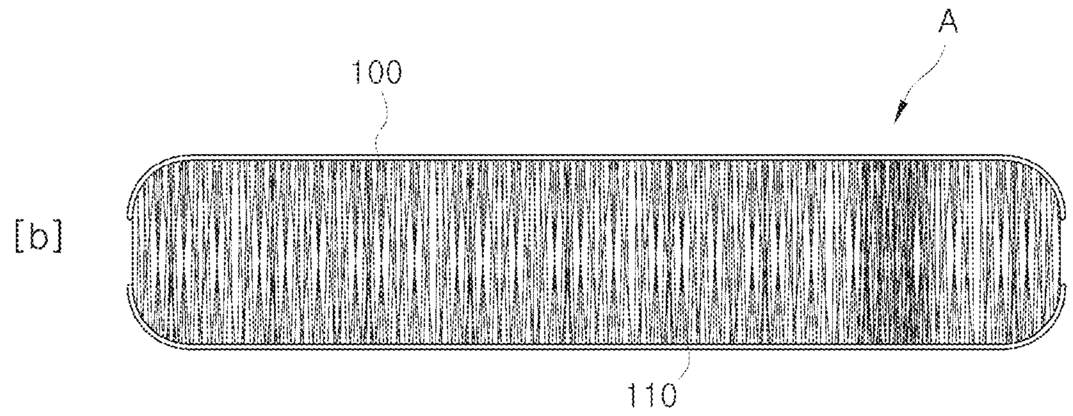
Figure 3A:
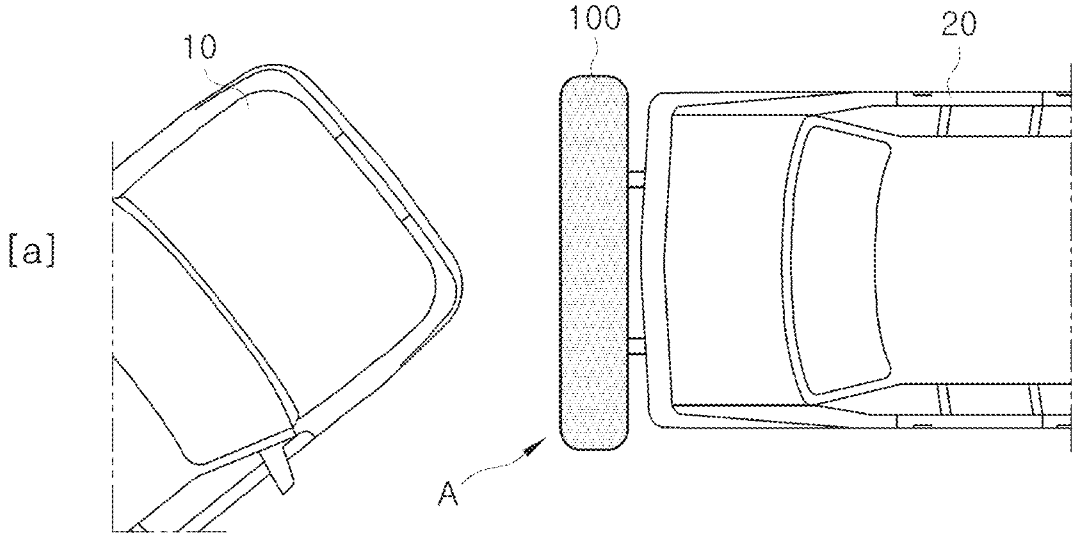
FIGS. 3*a* and 3*b* are example views illustrating change of the shock absorption structure in the case of collision of the shock absorption structure with a damaging object after the shock absorption structure of the present disclosure is installed on an installation mount according to the embodiment.
Figure 3B:
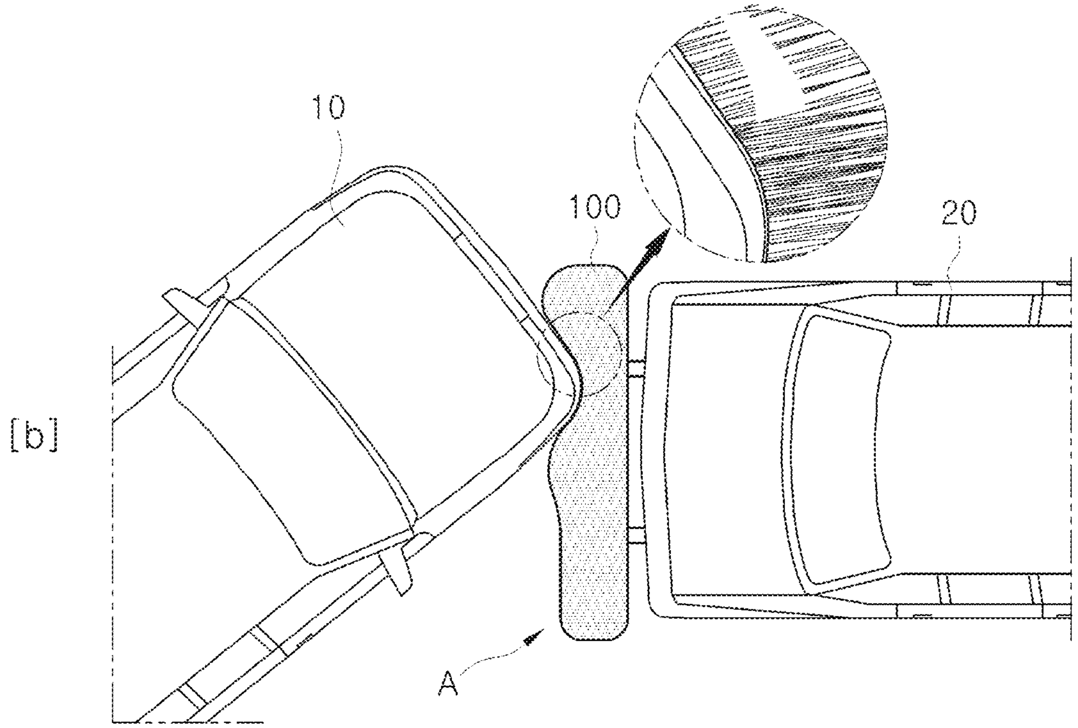

As illustrated in FIGS. 2*a* and 2*b*, the plurality of fiber threads 110 for connecting the front and rear surfaces of the body 100 to each other is provided inside the body 100. In this case, the fiber threads 110 may be fiber threads made of various materials with excellent strength and elasticity, and may be, for example, fiber threads including a reinforced nylon material. Such fiber threads 110 may tautly connect the front and rear surfaces of the body 100 to each other while air is filled in the body 100 as illustrated in FIGS. 2*a* and 2*b*. However, the number of the fiber threads 110 may vary in consideration of the size of the body 100 and the amount of a shock which the body 100 can absorb.

In addition, all of the fiber threads 110 may have the same lengths so that the front and rear surfaces of the body 100 are flat, and may selectively have different lengths so that the front and rear surfaces of the body 100 have curved shapes according to the installation environment of the shock absorption structure A, the type of the installation mount 20, or the type of an expected damaging object 10. In addition, the thicknesses, number, and strengths of the fiber threads 110 may be different according to the installation environment of the shock absorption structure A, the type of the installation mount 20, or the type of the expected damaging object 10, etc.

In this way, the body 100, whose front and rear surfaces are connected to each other by the fiber threads 110, may be installed so that the front surface faces the outside of the installation mount 20. The front surface of the body 100 to be described below refers to a surface of the body 100 installed toward the outside of the installation mount 20. In addition, a surface part of the body 100 connecting the front and rear surfaces of the body 100 to each other is referred to as a side surface of the body 100.

In the case of a collision of the damaging object 10, such as a vehicle or ship, etc. with the installation mount 20 on which the body 100 is installed, when impact force is below a predetermined level, the body 100 may absorb the impact due to properties of a material thereof, but when the impact force is a predetermined level or more, the body 100 absorbs the impact by wrapping around the damaging object 10. Specifically, as illustrated in FIGS. 3*a* and 3*b*, when the damaging object 10 applies at least a predetermined level of shock to one point of the body 100, fiber threads 110 connected to portions adjacent to the one point of the body 100 break, and the portions adjacent to the one point of the body 100 wrap around the damaging object 10.

As a result, the body 100 can stably absorb at least a predetermined level of impact force regardless of the direction of the collision not only for the installation mount 20 on which the body 100 is installed, but also for the damaging object 10 colliding with the body 100, thereby significantly reducing human and material damages due to collision accidents. In addition, the body 100 filled with air inside and having the front and rear surfaces connected to each other by the fiber threads 110 can be manufactured to be relatively light in weight compared to a conventional shock absorber, thereby inhibiting a significant decrease of fuel efficiency by installing the shock absorption structure A.

Figure 4:
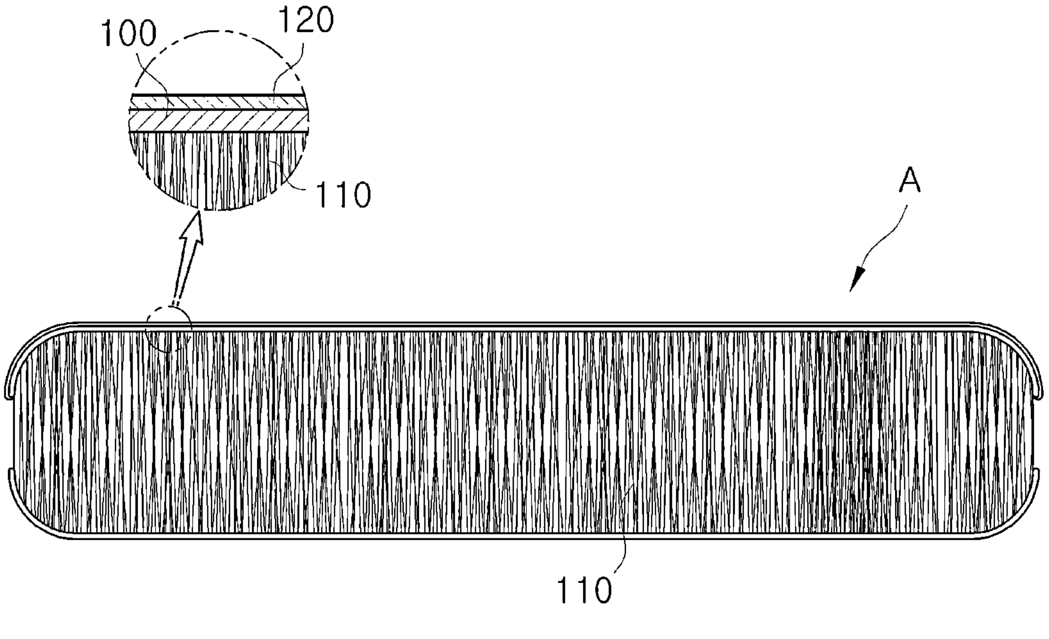
FIG. 4 is a cross-sectional view illustrating that a strength reinforcement member is provided on the front surface of the shock absorption structure of the present disclosure according to the embodiment.

In addition, the body 100, which directly collides with the damaging object 10, may be provided with the strength reinforcement member 120 as required. The strength reinforcement member 120 is preferably made of a material with relatively high strength compared to a material constituting the exterior of the body 100, and may be made of aramid fibers, for example. As illustrated in FIG. 4, the strength reinforcement member 120 may be attached to the front surface of the body 100, which is in direct contact with the damaging object 10 in the event of a collision, and may be attached to the entirety of the body 100. In particular, by attaching the strength reinforcement member 120 made of aramid fibers to the front surface of the body 100 and then wrapping the strength reinforcement member 120 again with a material of which the body 100 is formed, the outermost surface of the body is soft and a low-pressure air layer is formed in a portion on which the strength reinforcement member 120 is provided so that the initial value of a shock can be lowered.

Figure 5A:
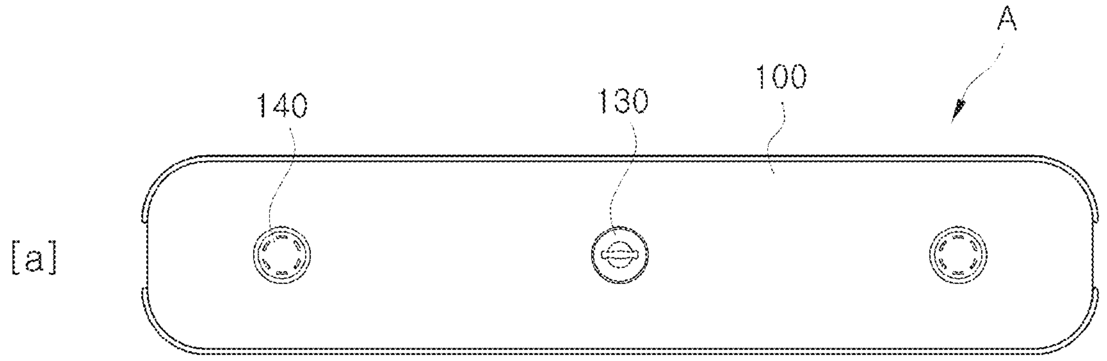
FIGS. 5*a* and 5*b* are views illustrating that an air inlet and an air outlet are provided in the shock absorption structure of the present disclosure according to the embodiment.
Figure 5B:
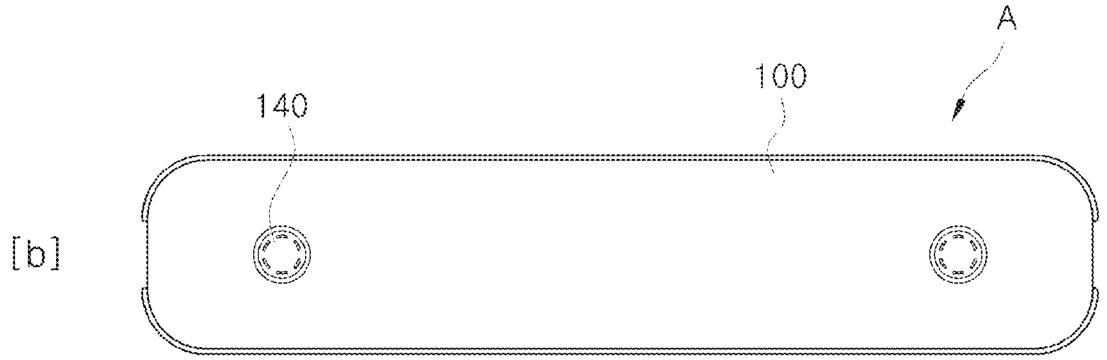

Meanwhile, as illustrated in FIGS. 5*a* and 5*b*, the body 100 of the shock absorption structure A may be provided with an air inlet 130 through which air is injected into the body, and an air outlet 140 through which air inside the body can be discharged to the outside. The air inlet 130 is connected to the air pump and is used to supply air into the body 100. The air outlet 140 is not only used to change the degree of a shock which the body 100 can absorb and the size of the body 100 by adjusting the amount of air filled within the body 100 as required, but also serves to discharge the air inside the body 100 to the outside in the event of a collision exceeding a predetermined amount of impact, allowing the body 100 to absorb the impact without bursting.

The front and rear surfaces of the body 100 are connected to each other by the fiber threads 110 inside the body 100, and the air inlet 130 and the air outlet 140 are preferably provided on the side surface of the body 100. In addition, it is preferable that a plurality of air outlets 140 are provided on the body 100 by being spaced by a predetermined interval apart from each other so that air is efficiently discharged to the outside through the air outlets 140 even if a collision having at least a predetermined amount of impact occurs in any direction.

Figures 6A, 6B:
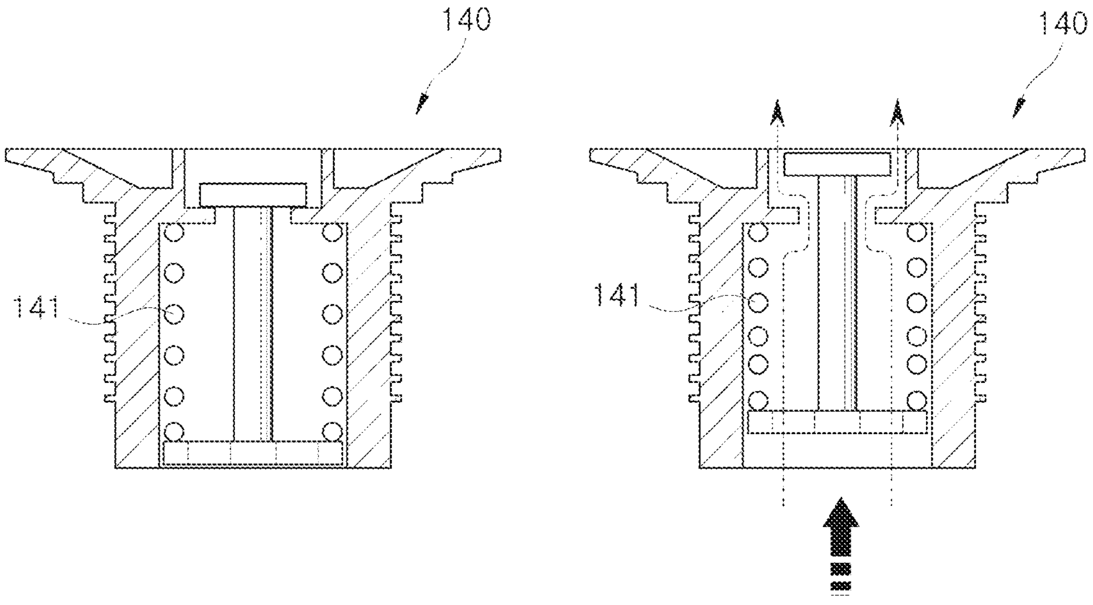
FIGS. 6*a* and 6*b* are example views illustrating the operation of the air outlet applied to the shock absorption structure of the present disclosure.

As a specific example, as illustrated in FIGS. 6*a* and 6*b*, the air outlet 140 may be provided with a spring 141 so that an entrance of the air outlet is sealed due to elasticity of the spring. An opening/closing instrument provided in the air outlet 140 normally seals the entrance by the elasticity of the spring 141 to maintain a state in which air does not escape to the outside of the body 100. In such a sealed state of the body 100, when a force greater than the elastic force of the spring 141 is applied to the body 100 from the outside due to collision of the body with the damaging object 10, the opening/closing instrument moves in a direction opposite to a direction in which the elastic force of the spring 141 acts and opens the entrance, allowing air to be discharged to the outside of the body 100.

In addition, the plurality of air outlets 140 provided in the body 100 may not only be provided with springs 141 having the same elastic forces, but may also be provided with springs 141 having different elastic forces. In each of the plurality of air outlets 140 provided with the springs 141 having different elastic forces, the entrance is opened only when impact force applied to the body 100 is greater than the elastic force of the spring 141. Accordingly, the number of opened air outlets 140 and the opening degree of the entrance of each of the air outlets 140 vary according on the size of the impact force, so appropriate shock absorption can be achieved in a collision situation. In addition, the size of the entrance of the air outlet 140 through which air is discharged may be changed according to an installation environment of the shock absorption structure A, the type of an installation mount 20, and the type of an expected damaging object 10, etc. For example, when the shock absorption structure A is used as a safety mat, the shock absorption structure A may be manufactured by adjusting the number of the air outlets 140 that open and the size of the entrance of each of the air outlets 140 in consideration of height from a damaging object 10, such as a person, falls and weight thereof.

The air outlet 140 opens only when a collision occurs and pressure inside the body 100 is a predetermined level or more and discharges air in the body to the outside, and then when the internal pressure of the body 100 decreases, the entrance of the air outlet closes, blocking the discharge of the air, and thus it is possible to prepare for secondary and tertiary accidents that may occur after a first accident, thereby minimizing damages due to accidents that may occur successively.

Figure 7:
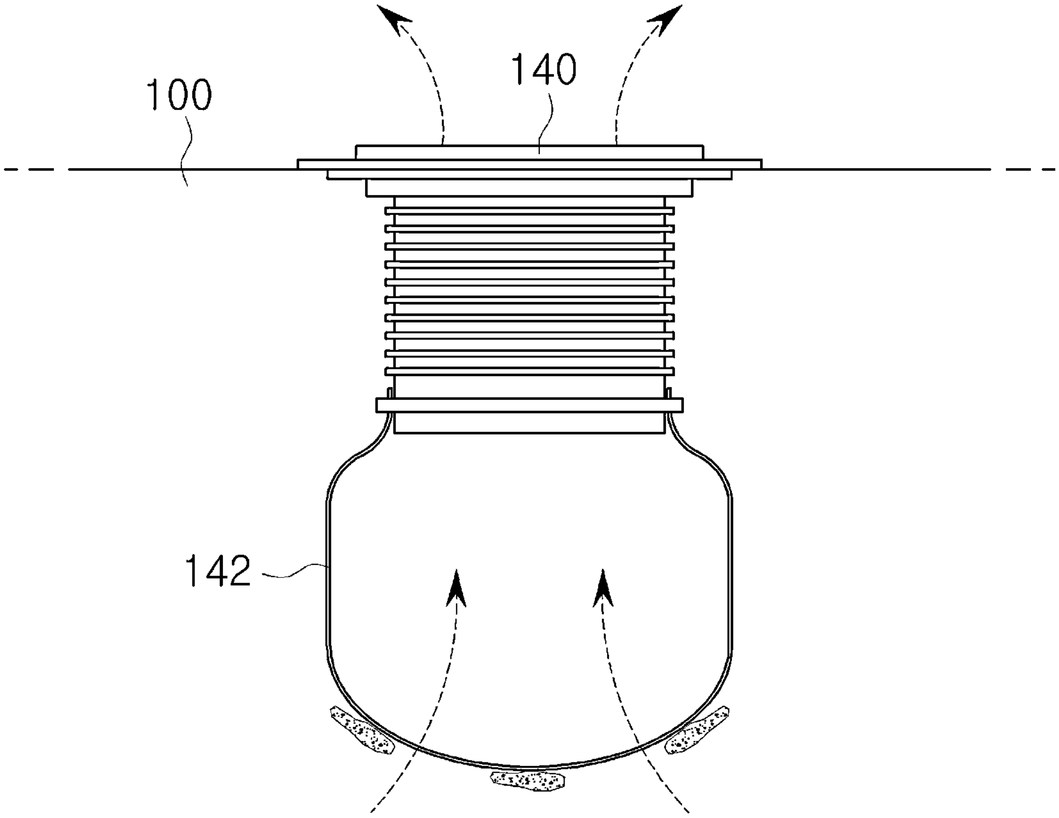
FIG. 7 is an example view illustrating that a filter is provided on the air outlet applied to the shock absorption structure of the present disclosure.

In addition, as illustrated in FIG. 7, the air outlet 140 may have a filter 142 provided inside the body 100, with filter 142 being configured to filter foreign substances so that only air is discharged through the entrance of the air outlet 140. The filter 142, which is in the form of a net, may be provided to wrap around a point of the air outlet 140 at which the filter communicates with the entrance. For example, the fiber threads 110 provided inside the body 100 may be cut in the process of a collision, and the cut fiber threads 110 may be stuck at the entrance of the air outlet 140 in the process of discharging air inside the body 100, and thus later the entrance of the air outlet 140 may not be closed properly. However, the filter 142 filters out foreign substances such as the cut fiber threads 110, thereby inhibiting the function of the air outlet 140 from being deteriorated.

Figure 8:
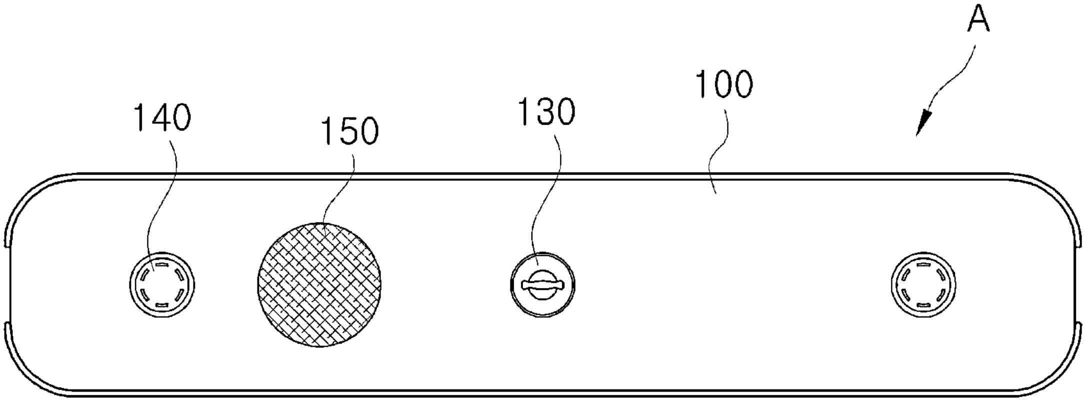
FIG. 8 is a top plan view illustrating that a burst inducing part is formed on the shock absorption structure of the present disclosure according to the embodiment.

Meanwhile, the shock absorption structure A may be configured so as not to lose a shock absorption function even in the event of a very large shock that is not sufficiently absorbed only by wrapping the damaging object 10 due to the breakage of the fiber threads 110 and discharging air to the outside through the air outlet 140. For example, as illustrated in FIG. 8, the body 100 may have a burst inducing part 150 formed on at least one point of the body 100, with the burst inducing part 150 having a surface strength weaker than surface strengths of the remaining portions of the body 100, and the burst inducing part 150 is preferably formed on the side surface of the body 100.

It is preferable that the burst inducing part 150 is configured to burst only when a high-pressure collision occurs within a short period of time and to have a size of about 1/100 to 1/50 of the area of the body 100 so that the body 100 can exercise a function thereof. Accordingly, in the shock absorption structure A, when a very large shock occurs, the burst inducing part 150 bursts along with air discharge through the air outlet 140, thereby inhibiting the body 100 from bursting unintentionally and enabling the body 100 to absorb a shock sufficiently.

Figure 9A:
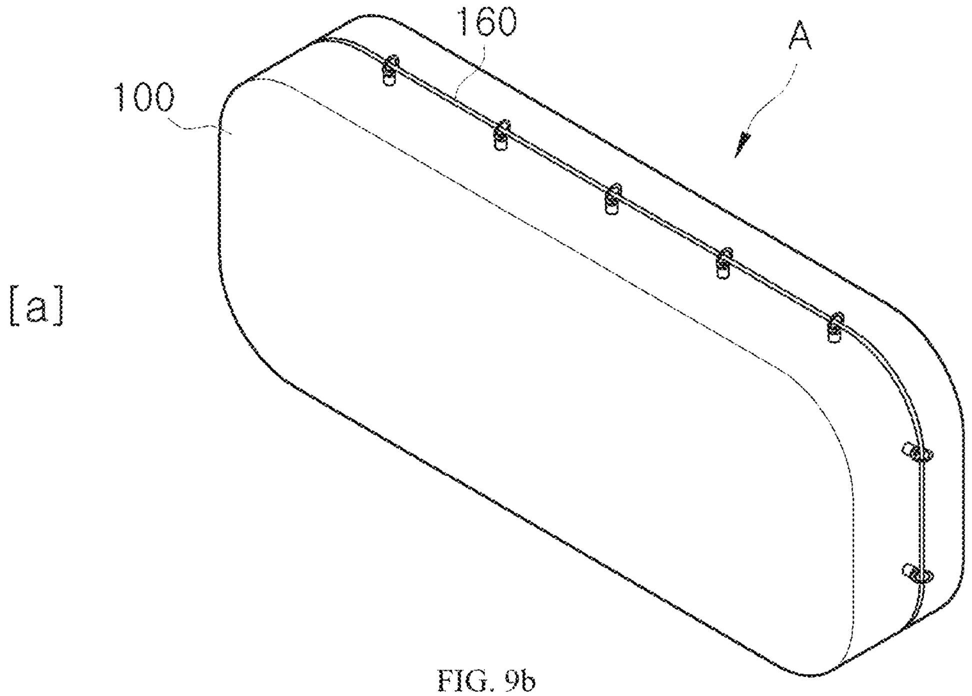
FIGS. 9*a* and 9*b* are perspective views illustrating an example in which a tension line is provided in the shock absorption structure of the present disclosure.
Figure 9B:
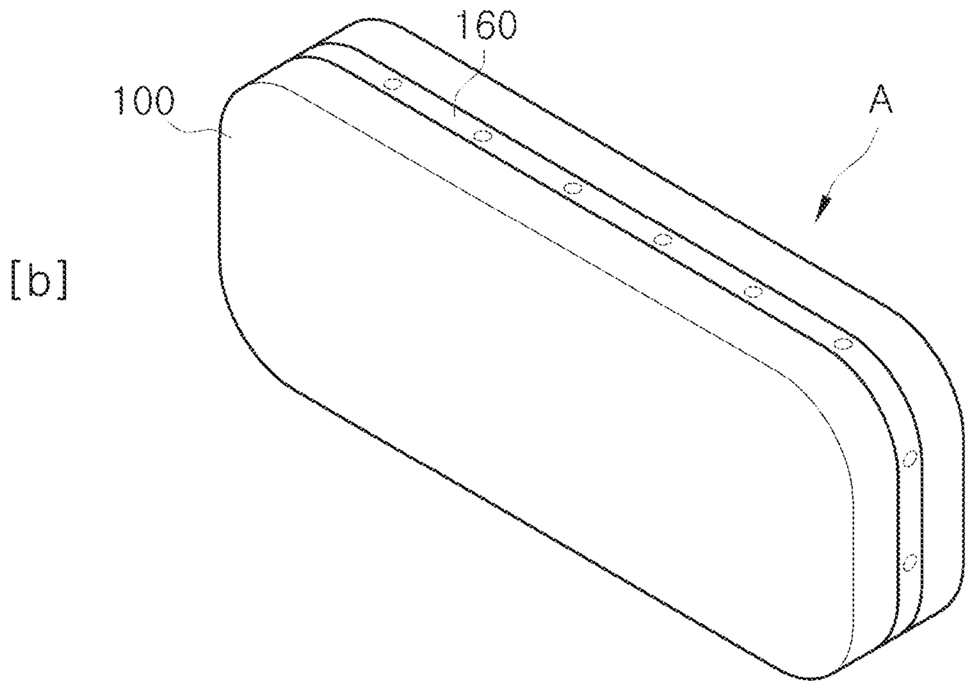
Figure 10:
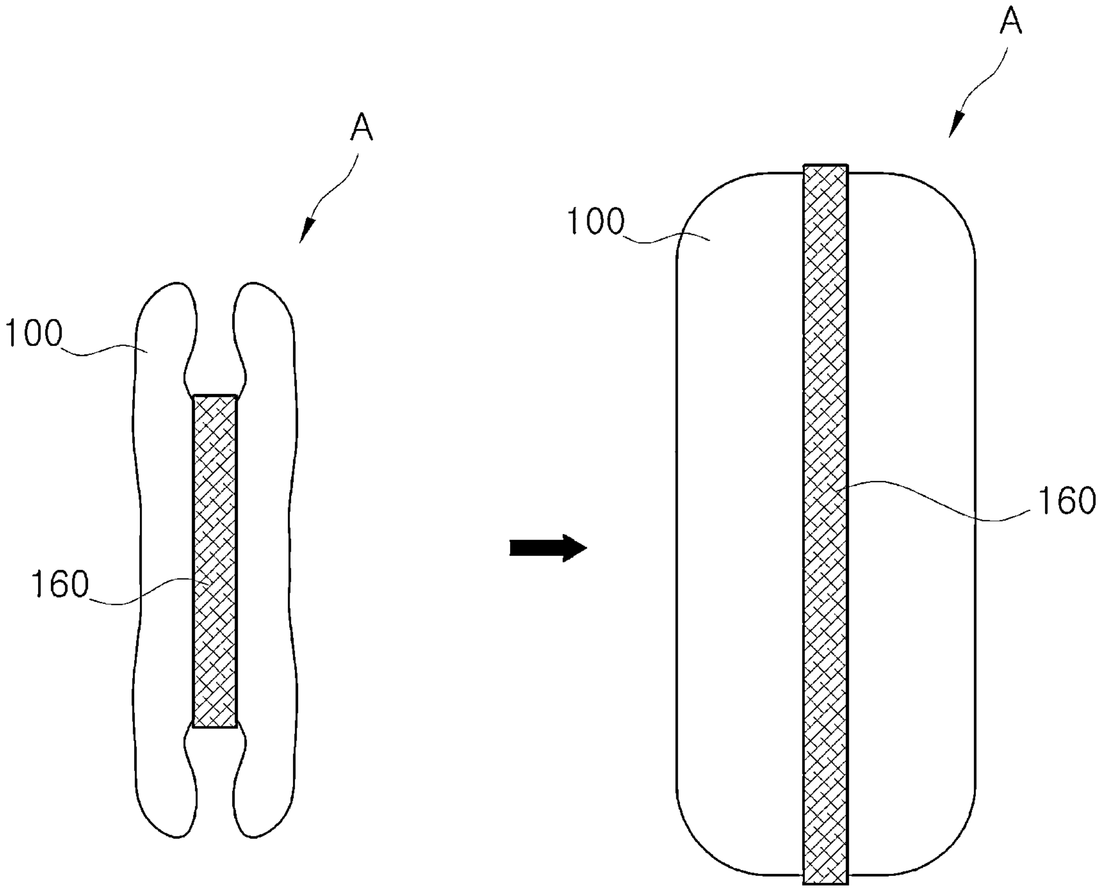
FIG. 10 is an example view illustrating that air is injected into a body provided with the tension line in the shock absorption structure of the present disclosure.

In addition, as illustrated in FIGS. 9*a*-10, the body 100 may be provided with a tension line 160 which has the shape of an elastic band and wraps around the side surface of the body 100. The tension line 160 may be provided to be positionally fixed at predetermined intervals on the side surface of the body 100 and to extend as the body 100 is supplied with air. For example, as illustrated in FIG. 9*a*, tension line fixers with fixing rings through which the tension line 160 can pass may be respectively provided at predetermined intervals along the side surface of the body 100, and the tension line 160 may be installed to pass through the fixing rings provided in the plurality of tension line fixers. For another example, as illustrated in FIG. 9*b*, the tension line 160 surrounding the side surface of the body 100 may be installed to join the side surface of the body 100 at predetermined intervals.

In this way, when the internal air of the body 100 provided with the tension line 160 is discharged to the outside, the side surface of the body 100 is tightened and rolled up by the tension line 160. Accordingly, in a situation in which the shock absorption function is not needed, air inside the body 100 may be discharged to the outside, which allows the body 100 to shrink to a predetermined shape.

In the shock absorption structure A, the body 100 described above may include a plurality of bodies 100. For example, it is preferable that the body 100 includes the plurality of bodies 100 arranged adjacently to each other such that a rear surface of one body 100 and a front surface of another body 100 are adjacent to each other so that a front surface of any one body 100 of the bodies 100 faces outward, so that all of the plurality of bodies 100 performs the shock absorption function. The plurality of bodies 100 may be integrated with each other by a cover body 200 that wraps around the bodies all at once.

Figure 11:
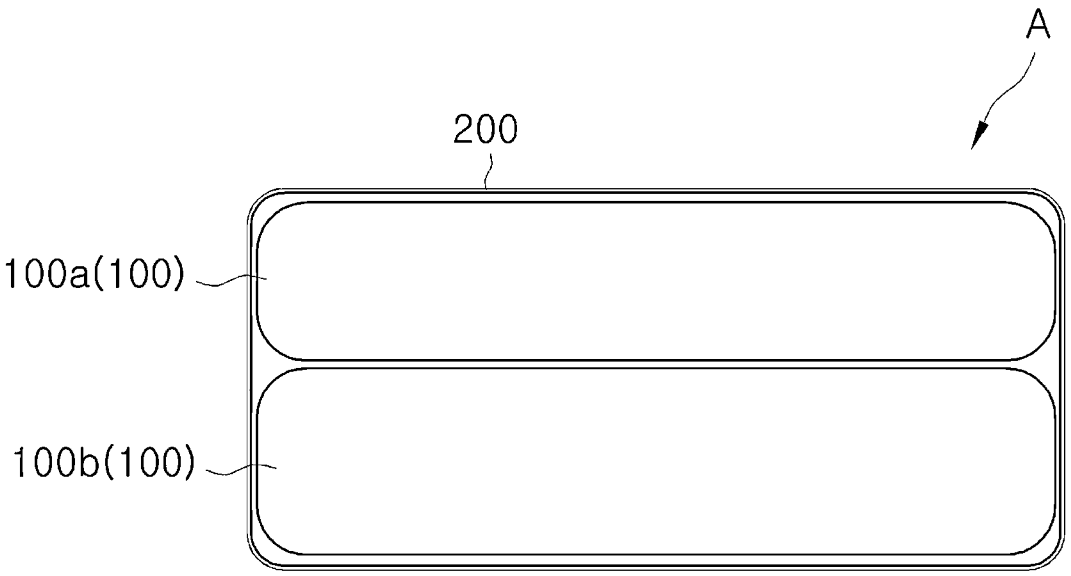
FIG. 11 is an example view illustrating that the shock absorption structure of the present disclosure is composed of a plurality of bodies.

As a specific example, as illustrated in FIG. 11, the body 100 may include a first body 100*a* having a front surface facing outward, and a second body 100*b* having a front surface arranged adjacently to a rear surface of the first body 100*a* and having a rear surface installed adjacently on the installation mount 20. In this case, the first body 100*a* and the second body 100*b* may be filled with air of the same pressures, and may be filled with air of different pressures. For example, the first body 100*a*, which is located outside the second body 100*b* and comes into contact with the damaging object 10, may be filled with air of pressure lower than air filled in the second body 100*b*. Accordingly, both low-speed and high-speed collisions may be prepared for, and the first body 100*a* having relatively low pressure may absorb a shock of the damaging object 10 by wrapping around a larger area of the damaging object 10.

Figure 12:
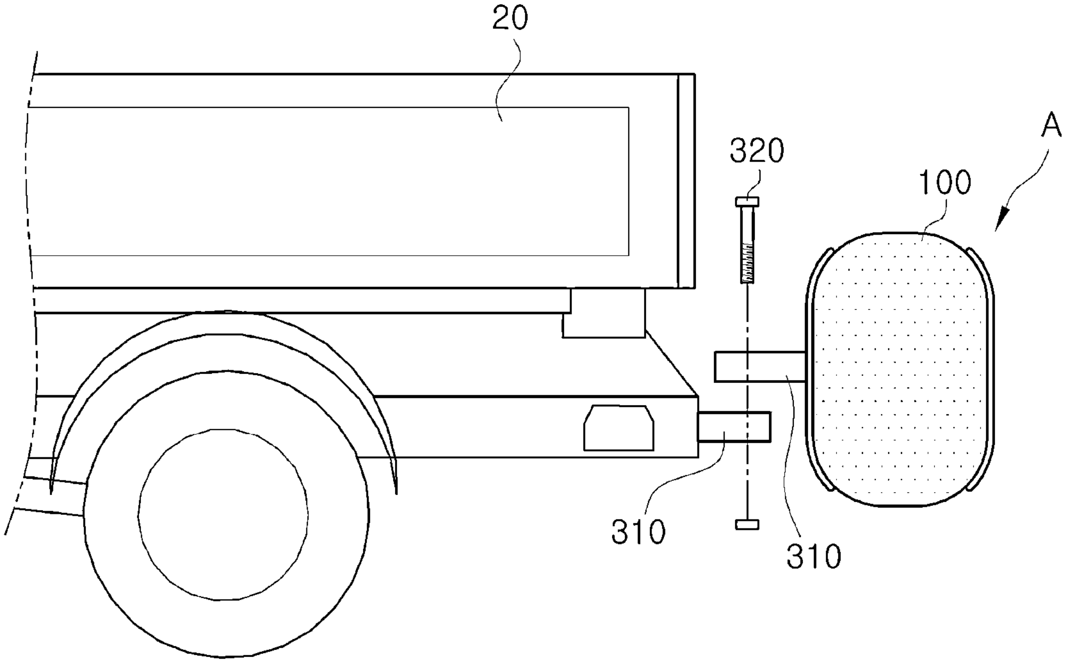
FIG. 12 is an example view illustrating that the shock absorption structure of the present disclosure is being coupled to the installation mount.

The shock absorption structure A described above may be installed at various positions of the installation mount 20 in various ways. For example, as illustrated in FIG. 12, the installation mount 20 may be a vehicle, and the body 100 may be installed on the rear side of the installation mount 20 to absorb a shock resulting from a collision from the rear. In addition, as an example of installation, a fixing bracket 310 into which a fixing pin 320 can be inserted is provided on an installation point in the installation mount 20, and a fixing bracket 310 into which the fixing pin 320 can be inserted is provided on the rear surface of the body 100. Accordingly, after the fixing bracket 310 of the installation mount 20 and the fixing bracket 310 of the body 100 overlap with each other, the fixing pin 320 is inserted into the fixing bracket 310 and is fixed by a nut so that the shock absorption structure A can be installed on the installation mount 20.

Figure 13:
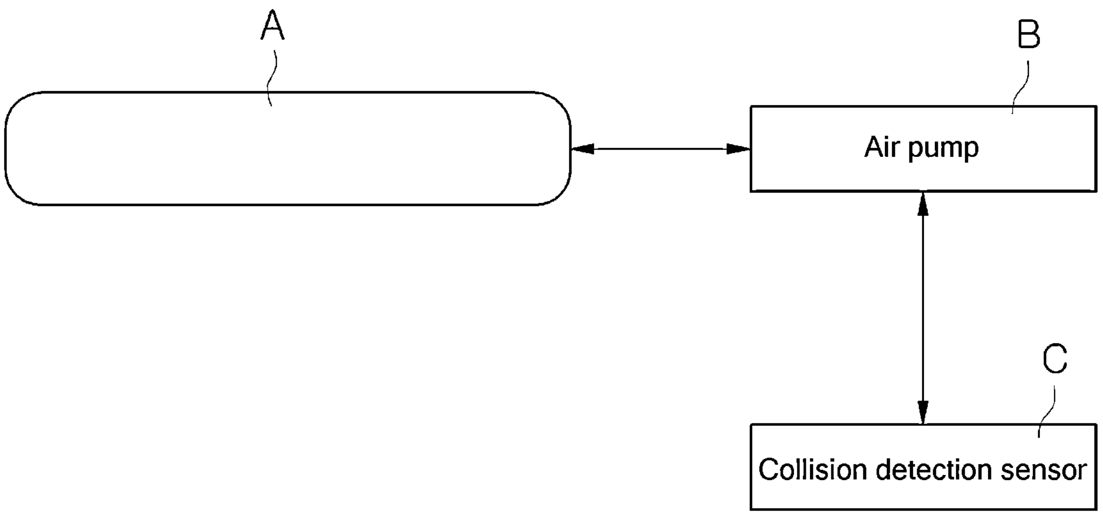
FIG. 13 is a configuration diagram illustrating a shock absorption system using the shock absorption structure of the present disclosure.

Meanwhile, as illustrated in FIG. 13, the shock absorption system using the shock absorption structure of the present disclosure includes the shock absorption structure A described above and the air pump B and may further include a collision detection sensor C. The detailed description of the shock absorption structure A has been made above, so the description thereof will be omitted.

The air pump B may inject air into the body 100 or remove air from the inside of the body 100 to adjust the amount of air filled in the body 100. The air pump B may not only inject air for a predetermined period of time, but may inject air instantaneously by using compressed gas.

In addition, the collision detection sensor C detects at least one of the volume, weight, speed, and distance of the damaging object 10 in real time. At this time, the air pump B may inject air into the body 100 or remove air from the inside of the body 100 on the basis of information detected by the collision detection sensor C. For example, in a case in which the damaging object 10 is a motorcycle or light vehicle, air is partially removed from the body 100 to inhibit the body 100 from being hard, thereby absorbing a shock to be safe without death or fatal injury due to serious damage.

In addition, while the body 100 is in a state in which air is not supplied or is supplied by a predetermined amount inside the body 100, air may be injected into the body 100 by the air pump B when a collision of the body with the damaging object 10 is expected on the basis of information detected by the collision detection sensor C. Through this, it is preferable that the body 100 is inflated only in a situation in which shock absorption is necessary to absorb shock, and occupies a small volume in normal times so as not to interfere with the movement of the installation mount 20 due to the shock absorption structure A.

Additionally, the shock absorption system using the shock absorption structure of the present disclosure may further include an air pressure measurement sensor that measures air pressure inside the body 100, and a management terminal that can manage the shock absorption structure A by receiving the internal air pressure of the body 100 measured by the air pressure measurement sensor.

DESCRIPTION OF THE REFERENCE NUMERALS IN THE DRAWINGS

| | |
|---|---|
| A: Shock absorption structure | B: Air pump |
| C: Collision detection sensor | |
| 10: Damaging object | 20: Installation mount |
| 100: Body | 100a: First body |
| 100b: Second body | 110: Fiber thread |
| 120: Strength reinforcement member | 130: Air inlet |
| 140: Air outlet | 141: Spring |
| 142: Filter | 150: Burst inducing part |
| 160: Tension line | |
| 200: Cover body | |
| 310: Fixing bracket | 320: Fixing pin |

The invention claimed is:

1. A shock absorption structure comprising:

a body (100) that is filled with air inside and is able to absorb a shock occurring due to a collision of the body with a damaging object (10), wherein a plurality of fiber threads (110) configured to tautly connect front and rear surfaces of the body to each other is provided inside the body (100), with air filled therein, so that when the damaging object (10) applies at least a predetermined level of shock to one point of the body (100), fiber threads (110) connected to portions adjacent to the one point break, and the body (100) absorbs the shock as the portions adjacent to the one point wrap around the damaging object (10).

2. The shock absorption structure of claim 1, wherein the body (100) is provided with a strength reinforcement member (120) made of aramid fibers at least on a front surface thereof.

3. The shock absorption structure of claim 1, wherein the body (100) comprises a plurality of bodies (100) arranged adjacently to each other such that a rear surface of one body (100) and a front surface of another body (100) are adjacent to each other so that a front surface of any one body (100) of the bodies (100) faces outward.

4. The shock absorption structure of claim 3, wherein the body (100) comprises a first body (100*a*) having a front surface facing outward, and a second body (100*b*) having a front surface arranged adjacently to a rear surface of the first body (100*a*) and having a rear surface installed adjacently on an installation mount (20), wherein the first body (100*a*) is filled with air of pressure lower than air filled in the second body (100*b*).

5. The shock absorption structure of claim 1, wherein the body (100) is provided with an air inlet (130) configured to inject air into the body (100) and an air outlet (140) configured to remove air from the inside of the body (100) so as to increase and decrease air filled in the body (100).

6. The shock absorption structure of claim 5, wherein the air outlet (140) is provided with a spring (141) so that an entrance of the air outlet (140) is sealed due to elasticity of the spring (141), and when a force greater than an elastic force of the spring (141) is applied to the body (100) from the outside, air is discharged through the entrance, wherein the body (100) is provided with a plurality of air outlets (140) respectively provided with springs (141) having different elastic forces.

7. The shock absorption structure of claim 5, wherein the air outlet (140) has a filter (142) provided inside the body (100), with the filter (142) being configured to filter foreign substances so that only air is discharged through an entrance of the air outlet (140).

8. The shock absorption structure of claim 5, wherein the body (100) has a burst inducing part (150) formed on at least one point thereof, with the burst inducing part (150) having a surface strength weaker than surface strengths of the remaining portions of the body (100), and when a high-pressure collision occurs within a short period of time, air is discharged through the air outlet (140) and the burst inducing part (150) bursts.

9. The shock absorption structure of claim 1, wherein the body (100) is provided with a tension line (160) that has a shape of an elastic band and wraps around a side surface of the body, wherein the tension line (160) is positionally fixed at predetermined intervals on the side surface of the body (100) and extends as the body (100) is supplied with air, and when air inside the body (100) is discharged to the outside, the side surface of the body (100) is rolled up by the tension line (160).

10. A shock absorption system using a shock absorption structure, the system comprising:

a shock absorption structure (A) having a body (100) that is filled with air inside and is able to absorb a shock occurring due to a collision of the body with a damaging object (10), wherein a plurality of fiber threads (110) configured to tautly connect front and rear surfaces of the body (100) to each other is provided inside the body (100), with air filled therein, so that when the damaging object (10) applies at least a predetermined level of shock to one point of the body (100), fiber threads (110) connected to portions adjacent to the one point break, and the body (100) absorbs the shock as the portions adjacent to the one point wrap around the damaging object (10); and an air pump (B) for injecting air into the body (100) or removing air from the inside of the body (100).

11. The system of claim 10, further comprising:

a collision detection sensor (C) configured to detect at least one of volume, weight, speed, and distance of the damaging object (10) in real time, wherein the air pump (B) injects air into the body (100) or removes air from the inside of the body (100) on a basis of information detected by the collision detection sensor (C).

12. The system of claim 11, wherein while the body (100) is in a state in which air is not supplied or is supplied by a predetermined amount inside the body (100), air is injected into the body (100) by the air pump (B) when a collision of the body (100) with the damaging object (10) is expected on the basis of the information detected by the collision detection sensor (C).

* * * * *